(No Model.)  5 Sheets—Sheet 1.
P. ATKINSON.
FRICTIONAL ELECTRICAL MACHINE.
No. 275,347.  Patented Apr. 10, 1883.
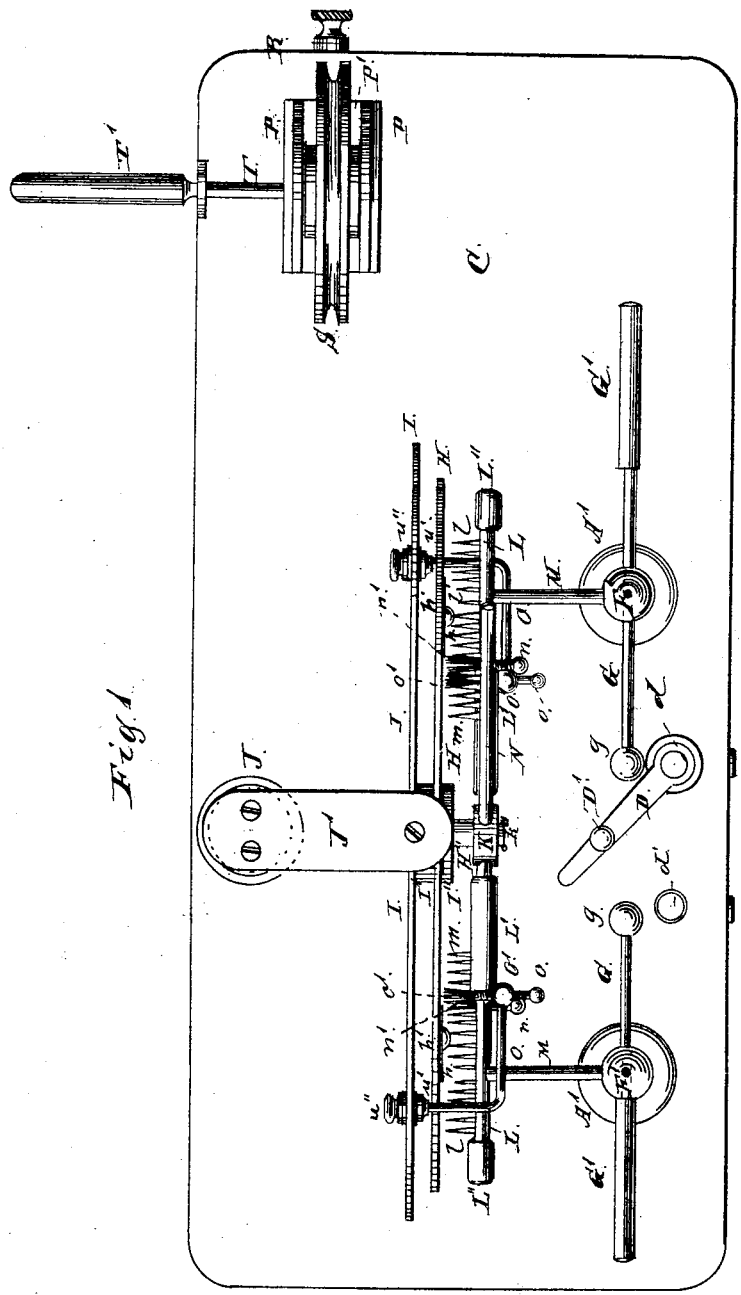
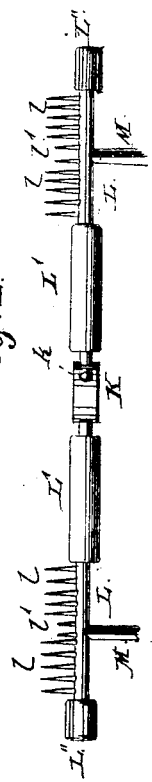
Witnesses:
Albert H. Adams.
O W Bond
Inventor:
Philip Atkinson

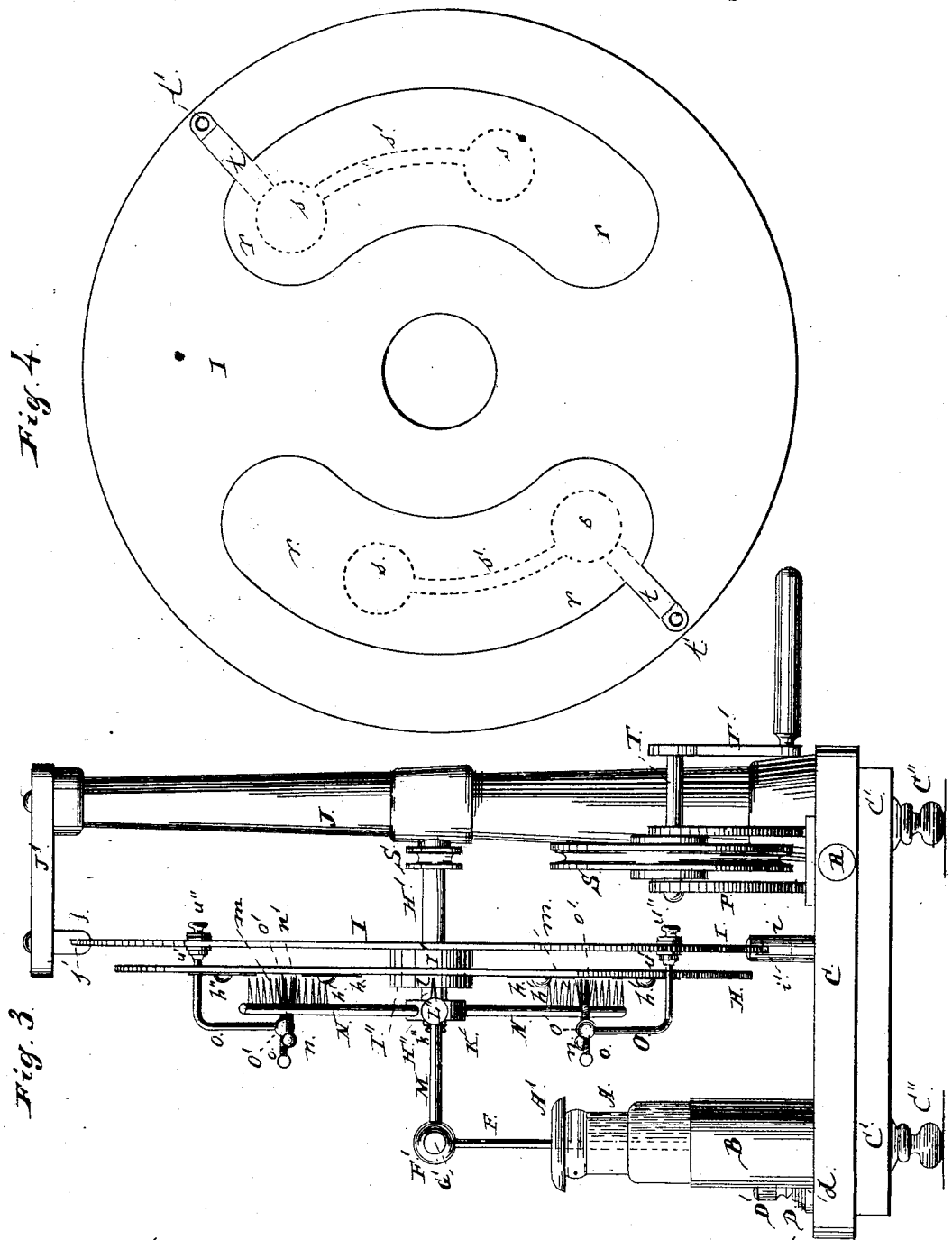

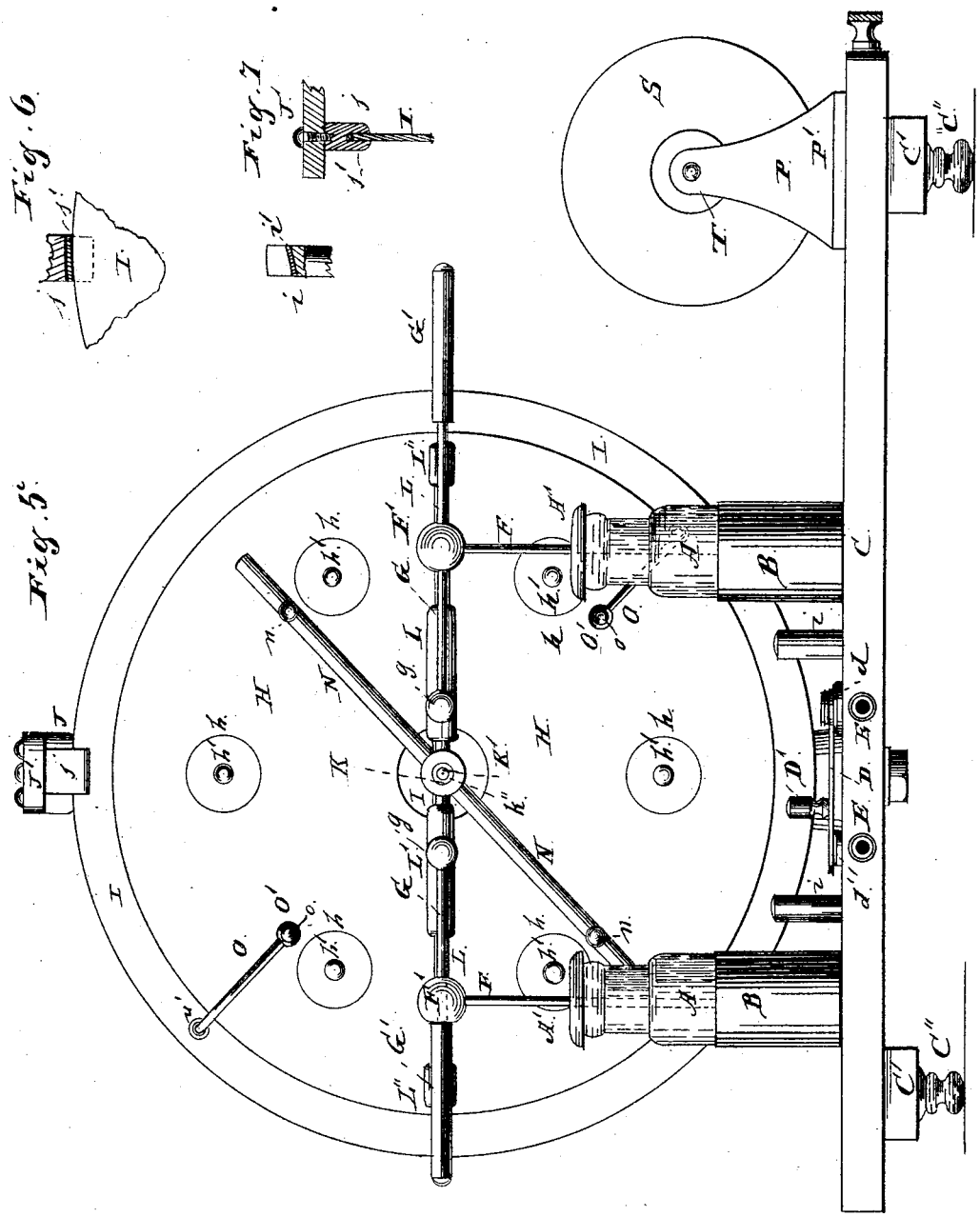

(No Model.) 5 Sheets—Sheet 4.
P. ATKINSON.
FRICTIONAL ELECTRICAL MACHINE.
No. 275,347. Patented Apr. 10, 1883.
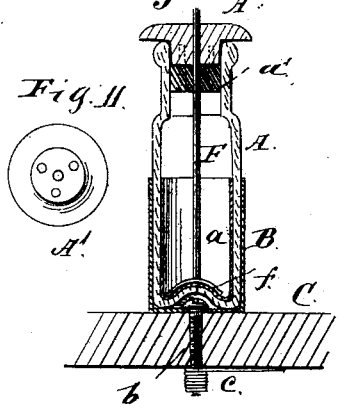
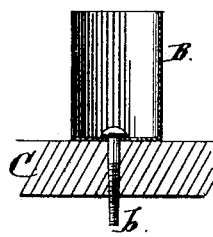
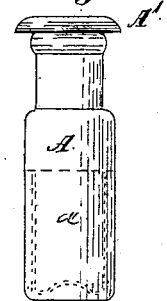
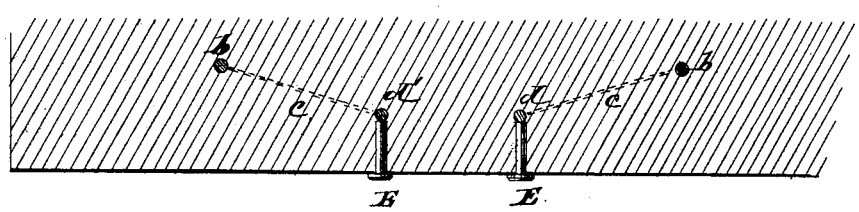
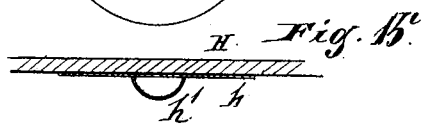
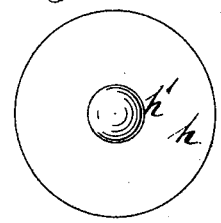
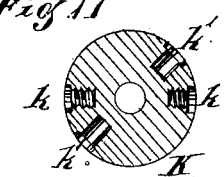
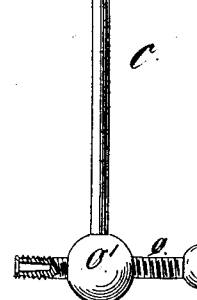
Witnesses:
Albert H. Adams.
O. W. Bond.
Inventor:
Philip Atkinson (No Model.) 5 Sheets—Sheet 5.
P. ATKINSON.
FRICTIONAL ELECTRICAL MACHINE.
No. 275,347. Patented Apr. 10, 1883.
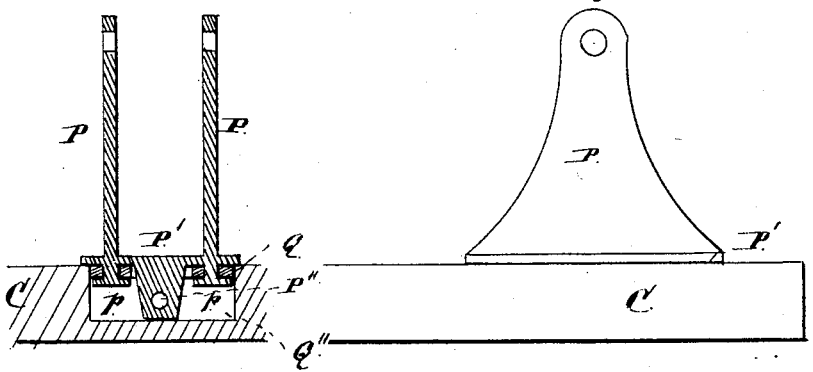
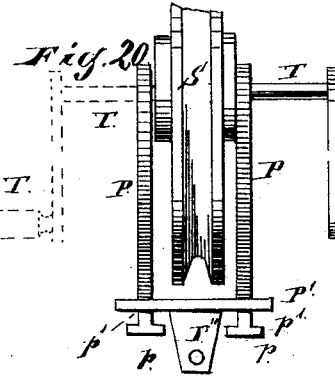
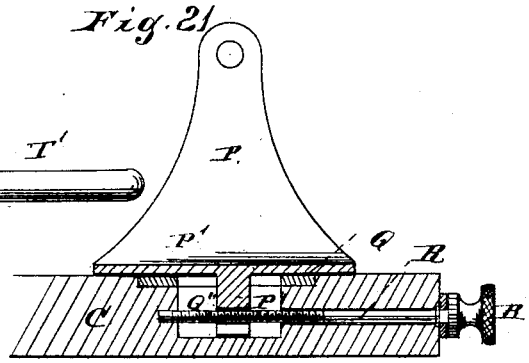
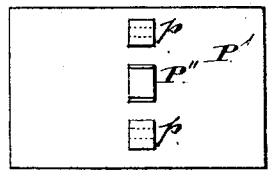
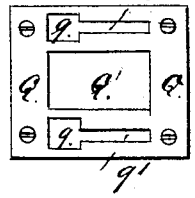
Witnesses:
Albert H. Adams.
O. W. Bond
Inventor:
Philip Atkinson

UNITED STATES PATENT OFFICE.

PHILIP ATKINSON, OF CHICAGO, ILLINOIS.

FRICTIONAL ELECTRICAL MACHINE.

SPECIFICATION forming part of Letters Patent No. 275,347, dated April 10, 1883.

Application filed September 2, 1882. (No model.)

*To all whom it may concern:*

Be it known that I, PHILIP ATKINSON, residing at Chicago, in the county of Cook and State of Illinois, and a citizen of the United States, have invented a new and useful Improvement in Electrical Machines, of which the following is a full description, reference being had to the accompanying drawings, in which—

Figure 1 is a top or plan view, with the switch connecting the two Leyden jars open; Fig. 2, a detail of the horizontal combs, the conducting-rods therefrom, and the disk to which the combs are attached; Fig. 3, an end elevation; Fig. 4, a detail, being a rear face view of the stationary plate or disk; Fig. 5, a front elevation; Figs. 6 and 7, details of the clamp for the upper edge of the stationary plate or disk; Fig. 8, a vertical central section of one of the Leyden jars and its socket or receptacle; Fig. 9, a central vertical section of the socket of the Leyden jar; Fig. 10, an elevation of one of the Leyden jars; Fig. 11, an under side view of one of the caps or covers for the Leyden jars; Fig. 12, a horizontal section of the bed-plate, showing the screws for attaching the sockets for the Leyden jars, the screws or pins for the switch, and the stationary electrodes for taking the charge to any desired point; Fig. 13, a detached view, partly in section, of one of the sockets for connecting with an electrical conductor; Figs. 14 and 15, enlarged details of the metal armatures on the revolving plate or disk; Fig. 16, an enlarged detail of the rod and screw for attaching the brush of the stationary plate or disk; Fig. 17, an enlarged detail, in section, of the hub or disk carrying the combs; Figs. 18, 19, 20, 21, and 22, enlarged details of the support for the main driving-wheel by which the movable plate or disk is rotated; Fig. 23, an enlarged detail of the socket-plate which carries the support for the main driving-wheel.

This invention relates to that class of electric machines for developing static electricity in quantities consisting of a stationary plate or disk, a revolving plate or disk, and combs and brushes, with conductors for passing the generated charge to a Leyden jar or other object, as may be desired, and to that class of such machines known as the "Toepler electric machine," which is for the arrangement of devices for developing such electricity.

The objects of this invention are to insure the retaining of the Leyden jars in position, and at the same time form the exterior coating of metal therefor; to give a more direct, perfect, and convenient connection between the Leyden jars for the passage of the electricity; to interrupt the induced electricity and produce an effect similar to the Faradic current, and transfer such electricity to any desired point; to prevent leakage or loss of electricity while passing through the plate from the brushes; to reduce the strain on the plate; to simplify and improve the arrangement of the devices composing the machine; to insure the passage of the electricity from the paper armatures directly through the plate and prevent loss or dissipation at that point; to improve the construction of the metal armatures on the revolving plate; to improve the manner of retaining the stationary plate in position by giving it an inflexible connection at the upper edge with a flexible packing to allow a slight yielding pressure and prevent injurious strain on the plate, and supporting the plate on the insulators at the bottom in the same manner and for the same purpose, and to attach the combs in proper relation with the other devices of the machine; and its nature consists in the several devices and combination of devices hereinafter described, and pointed out in the claims, by which the several results above enumerated are attained and the machine improved generally in its construction and operation.

In the drawings, A represents the Leyden jars, made of glass or other suitable material, as usual, with an interior coating, *a*, of tin-foil. Each jar is provided with a cap or cover, A', having a central opening for the passage of the conducting-rod, and these caps or covers are made in two sections, one of which, *a'*, is of cork or other soft flexible material that can be forced into the jar and make a tight joint without producing a breaking strain. The other section of the cap or cover can be made of wood, hard rubber, bone, or other rigid substance, that portion which enters the mouth of the jar being of a reduced size, so as to fit loosely. This making of the caps or covers in two sections, one of rigid material and the other of soft flexible material, is very desirable, as a tight joint between the cap or cover and the jar can be made without creating a breaking strain in forcing the cap or cover into place.

B represents cylinders of rigid material, open at the top and closed at the bottom, with a central hole in the bottom for the passage of the screw or pin $b$, by which the cylinders can be attached to the face or bed plate of the machine. These cylinders form sockets or receptacles to receive the body of the Leyden jar, and correspond in height to the height of interior coating of the jar, and are of such diameter as to fit the jar snugly. These receptacles or sockets B not only form a support for the jars, but also the exterior coating therefor, and by making them of rigid metal the jars, when inserted therein, will be maintained in a fixed position, enabling the machine to be handled without removing the jars from the bed-plate, thereby preventing any slipping of the jars in handling the machine, which, unless care is taken in the ordinary way of placing the jars loosely on the bed-plate, is liable to occur at any time. These sockets or receptacles should be made of metal possessing rigidity sufficient to form a support, and yet pliable enough to fit snugly around the exterior of the jar to form an exterior coating capable of being electrified by induction in the usual manner.

C is a base or bed plate, made of wood or other suitable material, on which the devices are mounted, and, as shown, near each end is a cross-piece, C′, with legs C″, for supporting the base or bed plate on a stand, table, or other support.

D is a switch, of any suitable metal, having an insulated handle or finger-piece, D′, which may be made of vulcanized rubber or other non-conducting material. This switch is pivoted at one end by a pin or screw, $d$, to the bed or base C, and its other end, when the switch is closed, rests upon a pin or screw, $d'$, as shown in Fig. 5, the switch being shown open in Fig. 1. These screws or pins $d\ d'$ pass through the bed or base C, and to their lower ends are connected wires $c$, one wire for each pin, which wires are extended across and attached at their ends to the pins or screws $d$ for the sockets of the Leyden jars, as shown in Fig. 12, forming a connection of the Leyden jars with the switch and with each other, so that the travel of the induced electricity between the jars can be interrupted by opening the switch, and its direction changed to produce an effect similar to the Faradic current. The electricity passes between the jars through the pins or screws $b$, wires $c$, and pins or screws $d\ d'$, and switch D when the switch is closed, and when the switch is open the travel is interrupted, so that the charge will not pass direct.

E are metal sockets inserted in the edge of the base or bed plate C in line with the screws or pins $d\ d'$, in contact with which the inner ends of the sockets are brought, so as to transfer the charge from the pins $d\ d'$ to the sockets, and these sockets are provided with holes $e$, for the insertion of a wire or other conductor by which the electricity can be conducted to any desired points—such as hand-electrodes held by a person or the machine—or to some other object, these sockets, in fact, forming stationary electrodes to receive the charge when the switch is open, and the connection between the Leyden jars is thereby interrupted in a direct line or passage.

F represents the jar-conductors, made of metal rods, one being used for each jar, having, as shown, at their lower ends a thin metallic plate, $f$, which comes in contact with the interior coating of the jar, as usual, and having at their upper ends enlargements or heads F′, for the passage of the sliding electrode-rods, and also having, as shown, a vertical hole for the insertion of a conducting-wire or other device to lead the charge to some other point than the electrodes.

G represents sliding rods passing through the horizontal openings in the heads F′, one end of each rod having a handle, G′, made of vulcanized rubber or other non-conducting material, and each rod having at its inner end a ball or other enlargement, $g$, forming the discharging-electrodes. These slide-rods G, with their electrodes $g$, operate in the usual manner.

H represents a circular disk or plate, made of vulcanized rubber, glass, or other non-conducting material, vulcanized rubber being preferred, as it can be more easily manipulated without danger of breaking, and will stand a greater strain and pressure in use. This plate or disk H has secured to its outer face metal disks $h$, having raised centers of a semi-cylindrical form, $h'$, which disks constitute the metal armatures of the machine. These metal disks $h\ h'$ are made of rigid metal, and may be of either a single piece or of separate pieces soldered or otherwise secured together to form a continuous piece, and by making them of a single piece or two pieces of rigid metal joined so as to be practically single their attachment to the plate can be easily and readily made. The rigidity makes them more durable, not being so easily defaced in use.

I is the stationary disk or plate, of a circular form, and made of vulcanized rubber, glass, or other non-conducting material, vulcanized rubber being preferred for the reason stated as to the plate H. This plate is supported at its lower edge above the base or bed plate by insulators $i$, the upper edges of which are slotted to receive the plate and the lower ends are inserted or otherwise secured to the base; and in order to prevent any jar from handling affecting the plate the slot in each insulator which receives the plate is provided with a packing of some soft flexible material.

J is a post or standard, secured in any suitable manner at its lower end to the base or bed plate C, and extending up, and having at its upper end a cross-piece, J', projecting over the plate I, forming a tie-piece for holding the upper edge of the plate, which is connected thereto by a slotted piece, j, the slot of which receives the edge of the plate, and is provided at its bottom with a packing, of cork or other soft flexible material, to lessen the jar and shock in handling the machine. By thus supporting the lower edge on the insulators i and clamping the upper edge by the piece j and tie-piece J' to the post or standard J it will be seen that the plate will be held in a very firm and rigid manner, with less danger of being broken by a shock or jar than if supported alone by the insulators. The plate H is located adjacent to the plate I, as usual, and is supported upon a revolving sleeve, H', which is mounted on a stationary shaft or spindle, K', which shaft or spindle is secured at one end in any firm manner to the post or standard J at the proper point to hang the plate H centrally of the plate I, a suitable opening being provided in the plate I at the center for the passage of the shaft and sleeve which carry the revolving plate. The plate H is held in position on a hub, I', of vulcanized rubber or other non-conducting material, by a nut or washer, I'', and the hub I' is to be secured firmly in any suitable manner to the revolving sleeve H', so that the rotation of the sleeve will revolve the plate H.

K is a hub or disk, of brass or other suitable conducting material, having a central opening to receive the end of the shaft K', on which it is held by a set-nut, k''. The edge or periphery of the hub or disk K is provided with openings k on opposite sides and in line with each other, and with openings k', also on opposite sides and in line with each other, as shown in Fig. 17, which openings, when the hub or disk is in place, are arranged so that the openings k will lie in a horizontal plane, while the openings k' will lie in a plane at an angle of forty-five degrees, and these openings k k' are for a purpose hereinafter described. The hub K is separated from the plate H by a washer, H'', interposed between the face of the disk and the face of the nut or washer I'', around the spindle K', as shown in Figs. 1 and 3, which washer H'' may be made of vulcanized rubber, brass, or other material.

L are metal rods, each having at its outer end an insulating tip or head, L'', of vulcanized rubber or other non-conducting material, and each rod at its inner end entering the end of an insulator, L', of vulcanized rubber or other non-conducting material, and between these insulators L' L'', on the side of each rod which lies adjacent to the plate H, is a series of teeth, l l', the center teeth, l', being cut away or shortened to allow the passage of the raised portions h' of the metal disks. The inner end of each insulator L' has secured therein a short wire or rod, having a screw-threaded end to enter one of the screw-threaded openings k in the disk K, and secure the comb as a whole in its horizontal position. These rods L, with the teeth l l', form the ordinary horizontal combs used in this class of machines.

M represents metal rods, connected at one end with the rods L and at the other with the heads or enlargements F', and forming the conductors between the horizontal combs and the Leyden jars.

N represents metal rods, secured at one end to the disk K by passing into the openings k', so as to stand at an angle of forty-five degees. These rods have at their outer ends teeth m, with an interposed brush, n', formed of metallic strands and carried by a screw, n, passing through the rod, by means of which screw the end of the brush can be adjusted to properly wipe the raised portion h' of the metal armatures, as usual.

O are metal rods, each bent, as shown in Fig. 16, to have its two arms stand at right angles, or nearly so, to each other. One end of these rods has an enlargement or head, O', in which is a screw-threaded opening for the passage of a screw, o, which carries a brush, o', made of metallic strands. These rods O are secured to the plate I on opposite sides and in line with each other, so as to have the brushes o' wipe the raised portion h' of the metal armatures, and the brushes are adjusted properly for this purpose by the screws o. These rods are each secured to the plate I by passing the end of each rod through a hole or opening made in the stationary plate and attaching a clamping-nut, n'', by means of which the collar n' is brought in contact with the opposite face of the plate, securing the rod firmly in position, and by thus attaching these brush-holders to the stationary plate the electricity which passes from the brushes to the armatures on the back of the plate-heads passes direct, preventing any leakage or loss, which does occur where the brush-holders are clamped or otherwise attached to the outer edge or periphery of the plate by metal clamps, ears, or other metal attachments, and this mode of attachment reduces the length of that part of the holders extending over the revolving plate, lessening the leverage and consequent strain on the plate in the use of the machine, and it also improves the appearance and general convenience, as it arranges the devices in a very compact space, economizes room, and simplifies the construction.

The back of the plate I is provided with paper armatures r, of the usual construction, attached to the plate in any usual and well-known manner, and between these armatures and the face of the plate are located disks s, of tin-foil, connected by a strip, s', as usual, the distance between the centers of the disks s being the same, or nearly the same, as the distance between the centers of the metal armatures, and arranged on the same circle as the circle of the metal armatures. The tin-foil disks are connected with the brush-holders on the plate I by a strip, t, connected at one end with one of the disks s and having a hole at the other end for the passage of the end of the rod O, and between the terminating point of the strip t and the periphery of the plate I the plate is left intact, so that a non-conductor is interposed between the connecting strips or conductors t and the edge of the plate, by which the electricity is made to pass directly through the plate between the brush-holders and the paper armatures, and will not suffer loss or wastage by leakage or dissipation, as is inevitably the case when the conductors t are continued to the edge of the plate, which has heretofore been the practice.

P are brackets or standards connected at their lower ends by a cross-piece, P′, from which depends an ear or lug, P″, having near its lower end a screw-threaded opening.

Q is a metal plate secured to the upper surface of the base C, and having a central opening, Q′, of an elongated form, for the passage of the stud or lug P″, on each side of which are openings q, with slots q′ leading therefrom. The openings q are for the passage of T-heads p on the base-plate P′, to enable the grooves p′ between the T-head and the plate to receive the edges of the plate Q on each side of the slots q′, so that the brackets or standards P will be retained in an upright position, and at the same time are free to be moved in and out.

R is an adjusting-screw passing horizontally into the end of the base C, and having a screw-threaded portion entering an opening in the stud or lug P″, so that by turning the screw forward or back the standards P can be moved in or out; S, a pulley-wheel located between the standards P, over which wheel and a smaller wheel, S′, on the revolving sleeve H′ a belt passes for driving the sleeve and imparting rotation to the plate H; T, the shaft on which the pulley S is mounted, which shaft is supported in suitable bearings at the upper ends of the standards P; T′, a crank connected to the shaft T, by means of which the operator revolves the wheel S.

It sometimes happens that the operator desires to work the machine from the front as well as the back, and to do this all that is necessary to be done is to withdraw the adjusting-screw R, remove the standards P, and reverse them, bringing the handle to the front of the machine, as shown by the dotted lines in Fig. 20, then replacing the standards and inserting the adjusting-screw, when the machine can be operated from the front. By locating the wheel S in adjustable standards, as shown, the operator can tighten the belt to take up the slack, or for other purposes, and this adjustment, it will be seen, can be readily made and to any degree of nicety.

The T-heads p could be omitted, if desired, in which case the lug and the screw would furnish the means for holding the standards firmly in place. By attaching the combs both horizontally and inclined to a central disk the time and trouble heretofore required in adjusting them in correct location for the armatures are dispensed with, as the holes in the disk which receive the ends of the combs are arranged so that when the disk is in position the combs will come in correct relation. By using rigid metal in forming sockets or receptacles for the Leyden jars the outside coating is provided, and also a means by which the jars will be retained in position under all circumstances, being attached firmly to the base of the machine, and the construction is such that a better connection, and one which is more direct and perfect, and can be more conveniently made, is provided between the jars for the passage of electricity by a conductor.

By interposing a switch connected with the outside coating of the Leyden jars the course or passage of the induced electricity can be readily interrupted or changed in its direction, with a result or effect similar to that of a Faradic current, which result or effect has not heretofore been accomplished with machines of this class, and is very valuable for many purposes, and by providing stationary electrodes coacting with the pins or screws supporting the switch the electricity can be transferred to a person, machine, or other object when the switch is open, enabling the machine to be used for various purposes for which it has not been heretofore adapted.

The operation will be readily understood from the foregoing description of the devices, but may be briefly described as follows: The operator, by rotating the wheel S through the handle G′, imparts through the driving belt and wheel S′ a rotary movement through the sleeve H′, rotating the plate H, and producing by such rotation and the action of the armatures, combs, and brushes a charge of static electricity, which is conveyed to the Leyden jars through the connecting-rods M, and from such jars is discharged through the sliding electrodes g, if so desired; or, by opening the switch and attaching wires or other connections to the stationary electrodes E, a charge can be conducted to a person or other point desired, the opening of the switch preventing a direct line of travel from the jars.

What I claim as new, and desire to secure by Letters Patent, is—

1. The combination, with a jar secured within a rigid cylinder or other receptacle and provided with an interior coating, the whole constituting a Leyden jar, of a supporting-bed and devices connecting the rigid cylinder or receptacle with said bed to secure the former in a stationary position, substantially as described.

2. The combination, with two jars, each secured within a rigid cylinder or receptacle which sustains its walls, and provided with an interior coating to form Leyden jars, of a supporting-bed, devices connecting the rigid cylinder or receptacle to the said bed, and an electrical connection between the Leyden jars, substantially as described.

3. The combination, with a jar secured within a rigid cylinder or receptacle which sustains its walls, and provided with an interior coating to form a Leyden jar, of a supporting-bed and a pin or screw passing through the bottom wall of the rigid cylinder or receptacle and secured to the said bed for attaching the Leyden jar in a fixed position, substantially as described.

4. The combination, with two jars interiorly lined and each secured within a rigid cylinder or receptacle, which sustains its walls to form Leyden jars, of a supporting-bed, a pin or screw passing through the bottom wall of each rigid cylinder or receptacle and secured to the said bed, and an electrical connection between the two jars, substantially as described.

5. The combination, with two interiorly-coated jars, each secured within a rigid cylinder or receptacle to form Leyden jars, of a supporting-bed to which the rigid cylinders or receptacles are attached in fixed positions, an independent electrical conductor connected with each jar and with the supporting-bed, and a movable switch interposed between the conductors and the jars to establish and interrupt the current between the jars, substantially as described.

6. The combination, with two Leyden jars of the character described, each provided with an independent electrical conductor, of frictional devices for developing static electricity, having a connection with each jar, and a movable switch interposed between the said electrical conductors for establishing and interrupting the current between the jars, substantially as set forth.

7. The combination, with two interiorly-lined jars, each secured within a rigid cylinder or receptacle to form Leyden jars, a supporting-bed, and a pin or screw passing through the bottom wall of each jar and secured to the said bed, of a wire extending from each pin or screw and disconnected at their outer terminals, and a movable switch interposed between the said terminals for establishing and interrupting the current between the jars, substantially as described.

8. The combination of two interiorly-lined jars, each secured within a rigid cylinder or receptacle to form Leyden jars, a supporting-bed, a pin or screw connecting the bottom wall of each rigid cylinder or receptacle to the said bed, a wire extending from each pin or screw, friction devices for developing static electricity, having a connection with both jars, and a movable switch interposed between the outer terminals of the said wires for establishing and interrupting the current between the jars, substantially as described.

9. The combination of two Leyden jars, a bed to which they are secured, two independent electrical conductors, each connected at one end with each jar, the vertical posts or pins exposed at the upper side of the bed, and forming the terminals of the electrical conductors, the sockets or tubes secured to the bed and connecting with the posts or pins, and a movable switch interposed between the posts or pins for establishing or interrupting the current between the jars, substantially as described.

10. The brackets or tubes E, posts or pins $d\ d'$, and switch D, in combination with Leyden jars, and wires $c$ for interrupting the electricity and transferring it, substantially as described.

11. The sockets or tubes E, posts or pins $d\ d'$, switch D, and wires $c$, in combination with the pins or screws $b$, the lined jars secured in the metal cylinders or receptacles B to form Leyden jars, and means for developing static electricity and conducting the same to the jars, substantially as described.

12. The combination, with the revolving plate or disk H, of the attached rigid metal armatures, composed of disks $h$, having the projecting central portions, $h'$, substantially as and for the purpose described.

13. The combination, with the revolving disk H, of the hub K, having the openings $k$, arranged in a horizontal plane, and the openings $k'$, arranged in a plane at or about an angle of forty-five degrees, and the comb-carrying rods secured in said openings, substantially as described, whereby two of the rods lie in the same horizontal plane and the other two stand at an angle thereto, for the purposes set forth.

14. The plate I, having holes near its periphery or edge, in combination with the rods O, attached to the said plates by passing through the said holes, and friction devices for developing static electricity, whereby the latter is conducted through the plate by the said rods, substantially as described.

15. The perforated plate I, having armatures $r$, in combination with the rods O, conductor $t$, receiving-disk $s$, and connecting-strip $s'$, for fastening the charge directly through the plate and preventing loss by leakage or otherwise, substantially as described.

16. The conducting-strips $t'$, terminating within the edge of the perforated plate I, and connecting the brush-holders with the armatures for preventing wastage from leakage or otherwise, substantially as specified.

17. The plate I, having holes near its periphery or edge, in combination with brush-holders passing through such holes, armatures $r$, disks $s$, connecting-strips $s'$, and conductors $t$, terminating within the edge or periphery of the plate I, for securing the brushes to the plate and preventing wastage or loss by leakage or otherwise, substantially as specified.

PHILIP ATKINSON.

Witnesses:
O. W. BOND,
A. H. ADAMS.

It is hereby certified that in Letters Patent No. 275,347, granted April 10, 1883, upon the application of Philip Atkinson, of Chicago, Ill., for an improvement in "Frictional Electrical Machines," the word "fastening," in line 109, page 5, of the printed specification, should be read "passing;" and that the Letters Patent should be read with this correction therein to make the same conform with the files and records of the case in the Patent Office.

Signed, countersigned, and sealed this 15th day of May, A. D. 1883.

[SEAL.]

M. L. JOSLYN,
*Acting Secretary of the Interior.*

Countersigned:
  E. M. MARBLE,
    *Commissioner of Patents.*